US012509326B2

(12) United States Patent
Li

(10) Patent No.: US 12,509,326 B2
(45) Date of Patent: Dec. 30, 2025

(54) CAR OPERATION PANEL, ELEVATOR SYSTEM AND DISPLAY METHOD OF CAR OPERATION PANEL

(71) Applicant: Otis Elevator Company, Farmington, CT (US)

(72) Inventor: Kai Li, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1758 days.

(21) Appl. No.: 16/707,758

(22) Filed: Dec. 9, 2019

(65) Prior Publication Data

US 2020/0180904 A1 Jun. 11, 2020

(30) Foreign Application Priority Data

Dec. 10, 2018 (CN) ........................ 201811502801.2

(51) Int. Cl.
*B66B 1/52* (2006.01)
*B66B 1/46* (2006.01)
(Continued)

(52) U.S. Cl.
CPC ................ *B66B 1/52* (2013.01); *B66B 1/463* (2013.01); *B66B 3/002* (2013.01); *B66B 3/02* (2013.01);
(Continued)

(58) Field of Classification Search
CPC ... B66B 1/468; B66B 2201/463; B66B 3/002; B66B 2201/103; B66B 2201/4615;
(Continued)

(56) References Cited

U.S. PATENT DOCUMENTS 5,194,702 A 3/1993 Swonger, Jr.
5,886,696 A * 3/1999 Kakko ...................... B66B 3/02
187/397

(Continued)

FOREIGN PATENT DOCUMENTS

CN 104276461 A * 1/2015 ............... B66B 1/14
CN 104925599 A 9/2015

(Continued)

OTHER PUBLICATIONS

European Search Report for application EP 19215039, dated May 7, 2020, 8 pages.

(Continued)

*Primary Examiner* — Jeffrey Donels
(74) *Attorney, Agent, or Firm* — CANTOR COLBURN LLP

(57) ABSTRACT

An elevator operation panel, an elevator system and an elevator panel display method. The elevator operation panel includes: a display area configured to display first floor information of the building based at least on an elevator movement trend, wherein the first floor information includes all floors that the elevator has not yet arrived at on the elevator movement trend; a touch control area configured to receive an input instruction; and a control unit configured to receive an input instruction from the touch control area, and adjust display information of the display area according to the input instruction, wherein the control unit is further configured to receive the floor change information of the building, and adjust the display information of the display area according to the floor change information of the building.

14 Claims, 2 Drawing Sheets

(51) Int. Cl.

| | |
|---|---|
| ***B66B 3/00*** | (2006.01) |
| ***B66B 3/02*** | (2006.01) |
| ***G06F 3/04847*** | (2022.01) |
| ***G06F 3/04886*** | (2022.01) |

(52) U.S. Cl.
CPC ...... *G06F 3/04847* (2013.01); *G06F 3/04886* (2013.01)

(58) Field of Classification Search
CPC ... B66B 1/14; B66B 1/463; B66B 2201/4623; B66B 2201/4607; B66B 2201/101
See application file for complete search history.

(56) References Cited

U.S. PATENT DOCUMENTS

| | | | | |
|---|---|---|---|---|
| 5,969,306 | A * | 10/1999 | Velauthapillai ......... B66B 1/462 187/399 | |
| 6,550,587 | B1 | 4/2003 | Yuasa et al. | |
| 6,997,288 | B2 | 2/2006 | Kakko et al. | |
| 7,398,865 | B2 | 7/2008 | Felder | |
| 7,445,090 | B2 * | 11/2008 | Bodmer .................. B66B 1/463 187/391 | |
| 7,469,772 | B2 * | 12/2008 | Takeuchi .................. B66B 3/02 187/391 | |
| 8,125,461 | B2 | 2/2012 | Weber et al. | |
| 8,136,636 | B2 | 3/2012 | Bahjat et al. | |
| 9,489,400 | B1 * | 11/2016 | Haitani ................... G06F 16/26 | |
| 9,902,591 | B2 | 2/2018 | Parkkinen et al. | |
| 2006/0225964 | A1 * | 10/2006 | Takeuchi ................ B66B 1/463 187/247 | |
| 2017/0297864 | A1 | 10/2017 | Koivisto et al. | |
| 2018/0118510 | A1 * | 5/2018 | Simcik .................. G06F 3/0484 | |
| 2018/0286100 | A1 * | 10/2018 | Brothers ............... A63F 13/822 | |
| 2020/0180904 | A1 * | 6/2020 | Li ............................ B66B 1/52 | |

FOREIGN PATENT DOCUMENTS

| | | | | | |
|---|---|---|---|---|---|
| CN | 104925600 | A | | 9/2015 | |
| CN | 111285212 | A | * | 6/2020 | ............... B66B 1/52 |
| CN | 116730133 | A | * | 9/2023 | |
| EP | 0733964 | A2 | * | 9/1996 | ............. G06F 3/033 |
| EP | 1386875 | A1 | * | 2/2004 | ............. B66B 1/463 |
| EP | 3015412 | A1 | | 5/2016 | |
| EP | 4238918 | A1 | * | 9/2023 | ............. B66B 1/468 |
| JP | H01288584 | A | * | 11/1989 | |
| JP | 2004099222 | A | | 4/2004 | |
| JP | 2014141315 | A | | 8/2014 | |
| JP | 5844423 | B2 | | 1/2016 | |
| JP | 2016003126 | A | * | 1/2016 | |
| KR | 20110114280 | A | | 10/2011 | |
| KR | 20120101744 | A | * | 9/2012 | |
| KR | 101821522 | B1 | * | 3/2018 | |
| KR | 20180087230 | A | * | 8/2018 | |
| WO | WO-0198189 | A1 | * | 12/2001 | ............. B66B 1/462 |
| WO | 0216246 | A1 | | 2/2002 | |
| WO | WO-2005077803 | A1 | * | 8/2005 | ............. B66B 1/463 |
| WO | 2006001804 | A2 | | 1/2006 | |
| WO | WO-2006025096 | A1 | * | 3/2006 | ............. B66B 1/461 |
| WO | 2006101316 | A1 | | 9/2006 | |
| WO | 2007108168 | A1 | | 9/2007 | |
| WO | WO-2014201624 | A1 | * | 12/2014 | ......... G06F 3/04817 |
| WO | WO-2018105124 | A1 | * | 6/2018 | ............... B66B 1/16 |

OTHER PUBLICATIONS

Otis Elevator Company, "Compass Plus Efficient Motion", www.otis.com, accessed Dec. 6, 2019, 11 pages.

Touch to go Technologies, "Elevator touchscreen systems 2014 product catalog", MAD Elevator Fixtures, Mar. 26, 2914, 44 pages.

* cited by examiner

CAR OPERATION PANEL, ELEVATOR SYSTEM AND DISPLAY METHOD OF CAR OPERATION PANEL

FOREIGN PRIORITY

This application claims priority to Chinese Patent Application No. 201811502801.2, filed Dec. 10, 2018, and all the benefits accruing therefrom under 35 U.S.C. § 119, the contents of which in its entirety are herein incorporated by reference.

FIELD OF THE INVENTION

The present application relates to the field of elevators, and in particular to an elevator operation panel and a display method thereof.

BACKGROUND OF THE INVENTION

At present, with the development and maturity of elevator technology, passengers have higher demand for the intelligence and convenience in the use of elevators. For example, as touch control screens are introduced into elevator display and call applications, more information can be displayed and a more flexible button layout becomes possible, but there is still space to optimize the display mode. For example, for a conventional elevator display panel, the change in its display size is usually limited, but the number of floors of the building in which it is installed may vary from several floors to dozens of floors, or even more than one hundred floors. In the case of a particularly large number of floors, if the elevator display panel is required to display all floors, the display identifier for each floor will be limited to a very small space, so it is extremely inconvenient for a passenger to quickly locate the desired floor. If the passenger enters the desired floor, such operation will take extra operation time and increase the complexity of panel display and the corresponding control mode.

SUMMARY OF THE INVENTION

In view of the above, the present application provides an elevator operation panel, an elevator system, and an elevator panel display method, thereby effectively solving or at least alleviating one or more of the above problems and problems in other aspects existing in the prior art.

In order to achieve the object of the present application, according to a first aspect of the present application, an elevator operation panel is provided, comprising: a display area configured to display first floor information of a building based at least on an elevator movement trend, wherein the first floor information includes all floors that the elevator has not yet arrived at on the elevator movement trend; a touch control area configured to receive an input instruction; and a control unit configured to receive an input instruction from the touch control area, and adjust display information of the display area according to the input instruction, wherein the control unit is further configured to receive floor change information of the building, and adjust the display information of the display area according to the floor change information of the building.

Optionally, the display area is further configured to display second floor information that is not on the elevator movement trend, wherein the second floor information has a different display effect from the first floor information.

Optionally, the first floor information and/or the second floor information is displayed by one or more of a number, a text, a progress bar, a percentage, or a color.

Optionally, the first floor information is displayed by a number or a text having a first brightness, and the second floor information is displayed by a number or a text having a second brightness.

Optionally, the first brightness is greater than the second brightness.

Optionally, the first floor information is displayed by a number or a text having a first color, and the second floor information is displayed by a number or a text having a second color.

Optionally, the second floor information is displayed by an ellipsis, wherein when the touch control area receives a corresponding input instruction, the control unit controls the ellipsis to unfold to display the second floor information.

Optionally, the elevator operation panel comprises a liquid crystal display, and the display area and the touch control area are integrated in the liquid crystal display.

In order to achieve the object of the present application, according to a second aspect of the present application, an elevator system is further provided, comprising: an elevator car configured to carry passengers; an elevator operation panel having a display area and a touch control area, wherein the display area is configured to display first floor information of a building based at least on an elevator movement trend, the first floor information including all floors that the elevator has not yet arrived at on the elevator movement trend, and wherein the touch control area is configured to receive an input instruction; and a control unit configured to receive an input instruction from the touch control area, and adjust display information of the display area according to the input instruction, wherein the control unit is further configured to receive floor change information of the building, and adjust the display information of the display area according to the floor change information of the building.

Optionally, the display area is further configured to display second floor information that is not on the elevator movement trend, wherein the second floor information has a different display effect from the first floor information.

Optionally, the first floor information and/or the second floor information is displayed by one or more of a number, a text, a progress bar, a percentage, or a color.

Optionally, the first floor information is displayed by a number or a text having a first brightness, and the second floor information is displayed by a number or a text having a second brightness.

Optionally, the first brightness is greater than the second brightness.

Optionally, the first floor information is displayed by a number or a text having a first color, and the second floor information is displayed by a number or a text having a second color.

Optionally, the second floor information is displayed by an ellipsis, wherein when the touch control area receives a corresponding input instruction, the control unit controls the ellipsis to unfold to display the second floor information.

Optionally, the elevator operation panel comprises a liquid crystal display, and the display area and the touch control area are integrated in the liquid crystal display.

Optionally, the control unit is provided in the elevator operation panel.

In order to achieve the object of the present application, according to a third aspect of the present application, an elevator panel display method is further provided, comprising: displaying, by a display area of the elevator panel, first floor information of the building based at least on an elevator movement trend, wherein the first floor information includes all floors that the elevator has not yet arrived at on the elevator movement trend; receiving, by a touch control area of the elevator panel, an input instruction; and receiving, by a control unit of the elevator or the elevator panel, an input instruction from the touch control area, and adjusting display information of the display area according to the input instruction, wherein the control unit is further configured to receive floor change information of the building, and adjust the display information of the display area according to the floor change information of the building.

Optionally, the display area is further configured to display second floor information that is not on the elevator movement trend, wherein the second floor information has a different display effect from the first floor information.

Optionally, the second floor information is displayed by an ellipsis, wherein when the touch control area receives a corresponding input instruction, the control unit controls the ellipsis to unfold to display the second floor information.

According to the elevator operation panel, the elevator system and the elevator panel display method of the present application, by displaying the corresponding floor information based on the elevator movement trend, on the one hand, the amount of information displayed on the panel can be reduced, and part of the information screening and filtering time of the passenger can be saved, and on the other hand, information most likely to be required by the passenger can be displayed with the maximum probability on the panel in the first place, so as to prevent the passenger from performing other operations to obtain the required information, thereby effectively improving passenger experience.

BRIEF DESCRIPTION OF THE DRAWINGS

The technical solutions of the present application are further described in detail below with reference to the accompanying drawings and embodiments. However, it should be understood that the drawings are designed only for the purpose of explanation, and therefore are not served to limit the scope of the present application. In addition, unless being pointed out in particular, the drawings are only intended to conceptually illustrate the structural constructions described herein, and are not necessarily drawn to scale.

DETAILED DESCRIPTION OF THE EMBODIMENT(S) OF THE INVENTION

The present application will be described in more detail hereinafter with reference to the accompanying drawings in which exemplary embodiments of the present application are illustrated. However, the present invention may be implemented in many different forms and should not be construed as being limited to the embodiments set forth herein. On the contrary, these embodiments are provided so that the disclosure of the present application becomes thorough and complete, and the concept of the present application is completely conveyed to those skilled in the art.

Although the features of the present application are disclosed in connection with several embodiments or one of the embodiments, if, however, such features may be desirable and/or advantageous for any given or identifiable function, such features may be combined with one or more other features of other implementations/embodiments.

Several functional entities may be mentioned herein, which do not necessarily have to correspond to physically or logically independent entities. These functional entities may be implemented by means of software, or implemented in one or more hardware modules or integrated circuits, or implemented in different processing devices and/or microcontroller devices.

Figure 1:
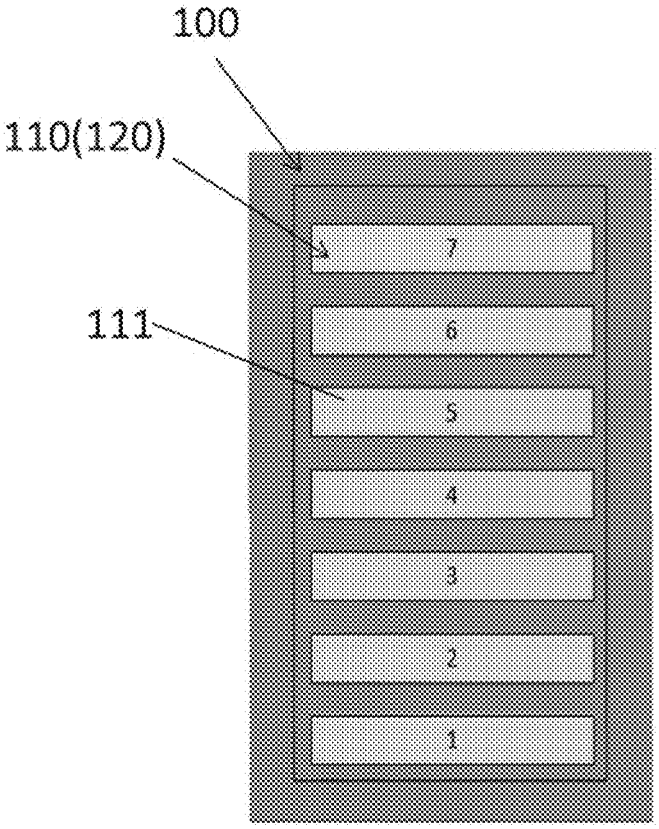
FIG. 1 is a schematic diagram of the display area of an elevator operation panel when an embodiment of the elevator system of the present application is on the 1$^{st}$ floor.
Figure 2:
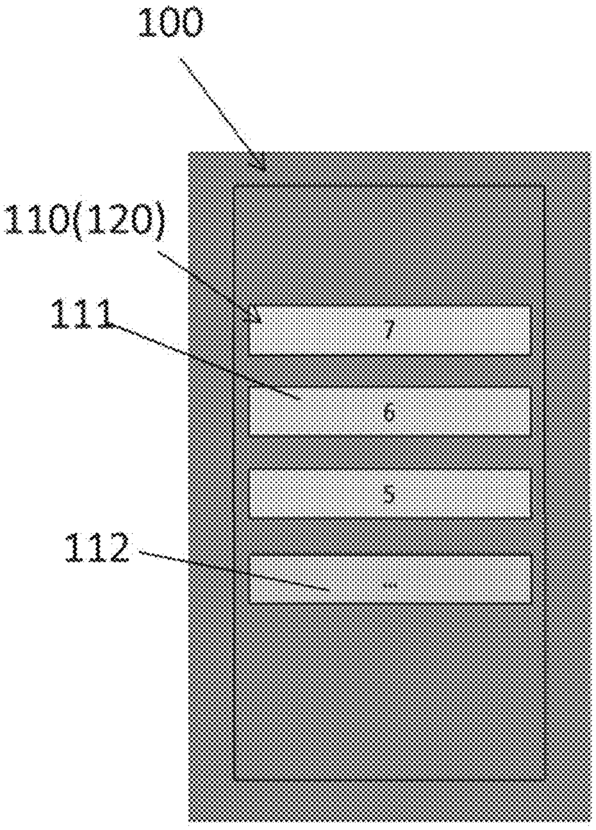
FIG. 2 is a schematic diagram of the display area of an elevator operation panel when an embodiment of the elevator system of the present application is on the 4$^{th}$ floor.

In conjunction with FIGS. 1 and 2, an embodiment of an elevator operation panel 100 is illustrated. The elevator operation panel 100 at least includes a display area 110, a touch control area 120, and a control unit (not shown). Specifically, the display area 110 is configured to display first floor information 111 of the building based at least on an elevator movement trend, wherein the first floor information 111 includes all floors that the elevator has not yet arrived at on the elevator movement trend. The touch control area 120 is configured to receive an input instruction. The control unit is configured to receive the input instruction from the touch control area 120, and adjust display information of the display area 110 according to the input instruction. Further, the control unit is configured to receive floor change information of the building, and adjust the display information of the display area 110 according to the floor change information of the building. Under such a configuration, according to the elevator operation panel 100 of the present application, by displaying the corresponding floor information based on the elevator movement trend, on the one hand, the amount of information displayed on the panel can be reduced, and part of the information screening and filtering time of the passenger can be saved, so that the passenger can quickly select the desired floor, and on the other hand, information most likely to be required by the passenger can be displayed with the maximum probability on the panel in the first place, so as to prevent the passenger from performing other operations to obtain the required information, thereby effectively improving passenger experience.

Wherein, the control unit mentioned in the foregoing embodiments may be directly disposed in or attached to the elevator operation panel 100, and it may also belong to the overall control unit of the corresponding elevator system. Accordingly, that the elevator operation panel 100 includes a control unit as described herein is intended to express the integrity in function, but not to emphasize that the operation panel 100 must include the corresponding hardware for the control unit.

In addition, it should be understood that, in this context, "elevator movement trend" refers to the movement direction of an elevator car in the elevator system after receiving one or more call instructions, which represents a time-continuous process. In this process, it is possible that the car moves up alone, moves down alone, or first moves up and then down, and so on. Therefore, the corresponding elevator floors on the elevator movement trend refer to part or all of the floors that the elevator car will sequentially pass or arrive at.

On the basis of the above, further improvements may be made to the components or functional parts therein or additional components and functional parts may be added based on the foregoing embodiments, as will be exemplarily explained below.

For example, the display area 110 may also be configured to display second floor information 112 that is not on the elevator movement trend, wherein the second floor information 112 has a different display effect from the first floor information 111. At this time, by providing different display effects, it is still possible to highlight the first floor information 111 most likely to be required by the passenger. At the same time, when the passenger has a call error or temporarily changes the request, an option to quickly change the call request will be offered to him/her.

As several alternative embodiments, the floor information appearing on the operation panel 100 may be displayed by one or more of a number, a text, a progress bar, a percentage, or a color.

More specifically, when the operation panel 100 contains two types of floor information at the same time, the first floor information 111 may be configured to be displayed by a number or a text having a first brightness, and the second floor information 112 is configured to be displayed by a number or a text having a second brightness, thereby facilitating distinction by the passenger. Alternatively, the first brightness may be configured to be greater than the second brightness, thereby enabling the first floor information 111 most likely to be required by the passenger to be more prominently displayed within the passenger's field of view.

As another alternative embodiment, when the operation panel 100 contains two types of floor information at the same time, the first floor information 111 may be configured to be displayed by a number or a text having a first color, and the second floor information 112 is configured to be displayed by a number or a text having a second color, thereby facilitating distinction by the passenger.

As a further alternative embodiment, to further highlight the key point, the second floor information 112 may be displayed by an ellipsis. When the passenger confirms that the required information is not in the first floor information 111, he/she may enter a corresponding input instruction on the touch control area 120, for example, by tapping a designated position, etc., to activate the ellipsis. When the touch control area 120 receives the corresponding input instruction, the control unit controls the ellipsis to unfold to display the second floor information 112. In this way, the first floor information 111 most likely to be required by the passenger can be prominently displayed in the field of view of the passenger, and the function of conveniently calling the second floor information 112 less likely to be required is also provided, thereby improving passenger experience.

In addition, as one of the hardware foundations in the foregoing embodiments, the elevator operation panel 100 may include a liquid crystal display. In this case, the display area 110 and the touch control area 120 may be integrated in the liquid crystal display, wherein the two may share the same area or may be partitioned from each other, which will be determined based on the actual situation. And there are relatively mature technical bases to implement these two solutions, so it will not be described in detail.

Although not shown in the drawings, an embodiment of an elevator system is also provided herein. The elevator system comprises: an elevator car configured to carry passengers; and an elevator operation panel 100 having a display area 110 and a touch control area 120. Wherein, the display area 110 is configured to display first floor information 111 of the building based at least on an elevator movement trend. The first floor information includes all floors that the elevator has not yet arrived at on the elevator movement trend. And the touch control area 120 is configured to receive an input instruction. In addition, the elevator system further includes a control unit configured to receive the input instruction from the touch control area 120, and adjust display information of the display area 110 according to the input instruction. And the control unit is further configured to receive floor change information of the building, and adjust the display information of the display area 110 according to the floor change information of the building. Under such a configuration, according to the elevator system of the present application, by displaying the corresponding floor information based on the elevator movement trend, on the one hand, the amount of information displayed on the panel can be reduced, and part of the information screening and filtering time of the passenger can be saved, so that the passenger can quickly select the desired floor, and on the other hand, information most likely to be required by the passenger can be displayed with the maximum probability on the panel in the first place, so as to prevent the passenger from performing other operations to obtain the required information, thereby effectively improving passenger experience.

The elevator operation panel 100 applied in the embodiments of the elevator system is similar to the elevator operation panel 100 separately mentioned in the foregoing embodiments. In addition, a certain modification is made to the control unit. As mentioned aforesaid, the control unit may be directly disposed in or attached to the elevator operation panel 100, and it may also belong to the overall control unit of the corresponding elevator system. Accordingly, that the elevator operation panel 100 includes a control unit as described herein is intended to express the integrity in function, but not to emphasize that the operation panel 100 must include the corresponding hardware for the control unit.

On the basis of the above, further improvements may be made to the components or functional parts therein or additional components and functional parts may be added based on the foregoing embodiments, as will be exemplarily explained below.

For example, the display area 110 may also be configured to display second floor information 112 that is not on the elevator movement trend, wherein the second floor information 112 has a different display effect from the first floor information 111. At this time, by providing different display effects, it is still possible to highlight the first floor information 111 most likely to be required by the passenger. At the same time, when the passenger has a call error or temporarily changes the request, an option to quickly change the call request will be offered to him/her.

As several alternative embodiments, the floor information appearing on the operation panel 100 may be displayed by one or more of a number, a text, a progress bar, a percentage, or a color.

More specifically, when the operation panel 100 in the elevator system contains two types of floor information at the same time, the first floor information 111 may be configured to be displayed by a number or a text having a first brightness, and the second floor information 112 is configured to be displayed by a number or a text having a second brightness, thereby facilitating distinction by the passenger. Alternatively, the first brightness may be configured to be greater than the second brightness, thereby enabling the first floor information 111 most likely to be required by the passenger to be more prominently displayed within the passenger's field of view.

As another alternative embodiment, when the operation panel 100 contains two types of floor information at the same time, the first floor information 111 may be configured to be displayed by a number or a text having a first color, and the second floor information 112 is configured to be displayed by a number or a text having a second color, thereby facilitating distinction by the passenger.

As a further alternative embodiment, to further highlight the key point, the second floor information 112 may be displayed by an ellipsis. When the passenger confirms that the required information is not in the first floor information 111, he/she may enter a corresponding input instruction on the touch control area 120, for example, by tapping a designated position, etc., to activate the ellipsis. When the touch control area 120 receives the corresponding input instruction, the control unit controls the ellipsis to unfold to display the second floor information 112. In this way, the first floor information 111 most likely to be required by the passenger can be prominently displayed in the field of view of the passenger, and the function of conveniently calling the second floor information 112 less likely to be required is also provided, thereby improving passenger experience.

In addition, as one of the hardware foundations in the foregoing embodiments, the elevator operation panel 100 may include a liquid crystal display. In this case, the display area 110 and the touch control area 120 may be integrated in the liquid crystal display, wherein the two may share the same area or may be partitioned from each other, which will be determined based on the actual situation. And there are relatively mature technical bases to implement these two solutions, so it will not be described in detail.

Likewise, although not shown in the drawings, an elevator panel display method is also provided herein. The display method comprises: displaying, by a display area 110 of the elevator panel, first floor information 111 of the building based at least on an elevator movement trend, wherein the first floor information 111 includes all floors that the elevator has not yet arrived at on the elevator movement trend. In addition, a touch control area 120 of the elevator panel is used to receive an input instruction. Further, a control unit of the elevator or the elevator panel is configured to receive the input instruction from the touch control area 120, and adjust display information of the display area 110 according to the input instruction. And the control unit is further configured to receive floor change information of the building, and adjust the display information of the display area 110 according to the floor change information of the building. Under such a configuration, on the one hand, the control unit can be used to receive an input instruction from the touch control area 120 and perform a corresponding operation, for example, to a corresponding floor or the like. On the other hand, the control unit can also be used to obtain the real-time floor change information of the elevator in the building and control the display area 110 to dynamically display the corresponding first floor information 111. For example, referring to FIGS. 1 and 2, for a building having a total of seven floors, when a passenger enters the elevator car from the lobby, the first floor information 111 displayed on the elevator operation panel 100 in the elevator car is the touch buttons of $1^{st}$-$7^{th}$ floors, which allows the passenger to choose any one therefrom to go to the corresponding floor. As the elevator ascends, the first floor information 111 displayed on the elevator operation panel 100 is gradually changed to the touch buttons of $2^{nd}$-$7^{th}$ floors, $3^{rd}$-$7^{th}$ floors, and the like. Another example is that when a second passenger calls from $4^{th}$ floor of the building, when he/she enters the elevator car, considering that the call request is shown as going up, the chance of going to the $1^{st}$-$4^{th}$ floors is extremely low (not absolutely impossible, for example, the passenger presses the wrong call direction, etc.), so the first floor information 111 displayed on the elevator operation panel 100 in the elevator car has been changed to the touch buttons of $5^{th}$-$7^{th}$ floors, so that the passenger can quickly acquire the desired floor. This kind of improvement is especially outstanding when the number of floors in a building is large, because as the number of floors increases, the display space for the identifier of each floor will become smaller, which will bring troubles in selection to passengers. In summary, according to the elevator panel display method of the present application, by displaying the corresponding floor information based on the elevator movement trend, on the one hand, the amount of information displayed on the panel can be reduced, and part of the information screening and filtering time of the passenger can be saved, so that the passenger can quickly select the desired floor, and on the other hand, information most likely to be required by the passenger can be displayed with the maximum probability on the panel in the first place, so as to prevent the passenger from performing other operations to obtain the required information, thereby effectively improving passenger experience.

On the basis of the above, the display area 110 may also be configured to display second floor information 112 that is not on the elevator movement trend, wherein the second floor information 112 has a different display effect from the first floor information 111. At this time, by providing different display effects, it is still possible to highlight the first floor information 111 most likely to be required by the passenger. At the same time, when the passenger has a call error or temporarily changes the request, an option to quickly change the call request will be offered to him/her.

More specifically, when the operation panel 100 contains two types of floor information at the same time, to further highlight the key point, the second floor information 112 may be displayed by an ellipsis. When the passenger confirms that the required information is not in the first floor information 111, he/she may enter a corresponding input instruction on the touch control area 120, for example, by tapping a designated position, etc., to activate the ellipsis. When the touch control area 120 receives the corresponding input instruction, the control unit controls the ellipsis to unfold to display the second floor information 112. In this way, the first floor information 111 most likely to be required by the passenger can be prominently displayed in the field of view of the passenger, and the function of conveniently calling the second floor information 112 less likely to be required is also provided, thereby improving passenger experience.

The present specification discloses the present application using embodiments, including optimal embodiment, and also enables those skilled in the art to carry out the present application, including manufacturing and using any apparatus or system, and performing any method contained therein. The protection scope of the patent of the present application is limited by the claims, and may include other embodiments conceivable to those skilled in the art. If these kinds of other embodiments have structural components having no difference from what is literally described in the claims, or if they include equivalent structural components having no substantial difference from what is literally described in the claims, then they are intended to be in the scope of the claims.

What is claimed is:

1. An elevator operation panel, comprising:

a display area configured to display first floor information of the building based at least on an elevator movement trend, wherein the first floor information includes all floors that the elevator has not yet arrived at on the elevator movement trend, wherein the display area is further configured to display second floor information that is not on the elevator movement trend, wherein the second floor information has a different display effect from the first floor information and wherein the second floor information is displayed by an ellipsis;

a touch control area configured to receive an input instruction; and a control unit configured to receive an input instruction from the touch control area, and adjust display information of the display area according to the input instruction, wherein when the touch control area receives a corresponding input instruction, the control unit controls the ellipsis to unfold to display the second floor information; and wherein the control unit is further configured to receive floor change information of the building, and adjust the display information of the display area according to the floor change information of the building;

wherein the control unit is further configured to modify and display the information corresponding to the newly arrived floor in the first floor information in real time as the second floor information according to current elevator movement trend.

2. The elevator operation panel according to claim 1, wherein the first floor information and/or the second floor information is displayed by one or more of a number, a text, a progress bar, a percentage, or a color.

3. The elevator operation panel according to claim 2, wherein the first floor information is displayed by a number or a text having a first brightness, and the second floor information is displayed by a number or a text having a second brightness.

4. The elevator operation panel according to claim 3, wherein the first brightness is greater than the second brightness.

5. The elevator operation panel according to claim 2, wherein the first floor information is displayed by a number or a text having a first color, and the second floor information is displayed by a number or a text having a second color.

6. The elevator operation panel according to claim 1, wherein the elevator operation panel comprises a liquid crystal display, and wherein the display area and the touch control area are integrated in the liquid crystal display.

7. An elevator system, comprising:

an elevator car configured to carry passengers;

an elevator operation panel according to claim 1.

8. The elevator system according to claim 7, wherein the first floor information and/or the second floor information is displayed by one or more of a number, a text, a progress bar, a percentage, or a color.

9. The elevator system according to claim 8, wherein the first floor information is displayed by a number or a text having a first brightness, and the second floor information is displayed by a number or a text having a second brightness.

10. The elevator system according to claim 9, wherein the first brightness is greater than the second brightness.

11. The elevator system according to claim 8, wherein the first floor information is displayed by a number or a text having a first color, and the second floor information is displayed by a number or a text having a second color.

12. The elevator system according to claim 7, wherein the elevator operation panel comprises a liquid crystal display, and wherein the display area and the touch control area are integrated in the liquid crystal display.

13. The elevator system according to claim 7, wherein the control unit is provided in the elevator operation panel.

14. An elevator panel display method, comprising:

displaying, by a display area of the elevator panel, first floor information of the building based at least on an elevator movement trend, wherein the first floor information includes all floors that the elevator has not yet arrived at on the elevator movement trend, wherein the display area is further configured to display second floor information that is not on the elevator movement trend, wherein the second floor information has a different display effect from the first floor information and wherein the second floor information is displayed by an ellipsis;

receiving, by a touch control area of the elevator panel, an input instruction; and receiving, by a control unit of the elevator or the elevator panel, an input instruction from the touch control area, and adjusting the display information of the display area according to the input instruction, wherein when the touch control area receives a corresponding input instruction, the control unit controls the ellipsis to unfold to display the second floor information; and wherein the control unit is further configured to receive floor change information of the building, and adjust the display information of the display area according to the floor change information of the building;

wherein the control unit is further configured to modify and display the information corresponding to the newly arrived floor in the first floor information in real time as the second floor information according to current elevator movement trend.

* * * * *